United States Patent
Du et al.

(10) Patent No.: US 10,187,869 B2
(45) Date of Patent: Jan. 22, 2019

(54) SYSTEM INFORMATION ACQUISITION BASED ON PAGING MESSAGE INDICATORS FOR NORMAL AND EXTENDED MODIFICATION PERIODS

(71) Applicant: Nokia Solutions and Networks Oy, Espoo (FI)

(72) Inventors: Lei Du, Beijing (CN); Yan Ji Zhang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 102 days.

(21) Appl. No.: 14/912,269

(22) PCT Filed: Aug. 16, 2013

(86) PCT No.: PCT/CN2013/081634
§ 371 (c)(1),
(2) Date: Feb. 16, 2016

(87) PCT Pub. No.: WO2015/021643
PCT Pub. Date: Feb. 19, 2015

(65) Prior Publication Data
US 2016/0192434 A1    Jun. 30, 2016

(51) Int. Cl.
*H04W 76/28* (2018.01)
*H04W 68/00* (2009.01)
*H04W 52/02* (2009.01)
*H04W 4/70* (2018.01)

(52) U.S. Cl.
CPC ........... *H04W 68/005* (2013.01); *H04W 4/70* (2018.02); *H04W 52/0216* (2013.01); *H04W 76/28* (2018.02); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01); *Y02D 70/24* (2018.01)

(58) Field of Classification Search
None
See application file for complete search history.

(56) References Cited

U.S. PATENT DOCUMENTS

| | | | |
|---|---|---|---|
| 9,699,710 B2 * | 7/2017 | Lee | H04W 48/12 |
| 2005/0195852 A1 | 9/2005 | Vayanos et al. | |
| 2009/0310503 A1 | 12/2009 | Tenny et al. | |
| 2012/0207069 A1 | 8/2012 | Xu et al. | 370/311 |
| 2012/0236775 A1 * | 9/2012 | Wang | H04W 72/005 370/312 |
| 2014/0321381 A1 * | 10/2014 | Guo | H04W 52/0251 370/329 |
| 2014/0362752 A1 * | 12/2014 | Jha | H04W 36/22 370/311 |

(Continued)

FOREIGN PATENT DOCUMENTS

| | | |
|---|---|---|
| CN | 102783221 A | 11/2012 |
| EP | 1 193 985 A1 | 4/2002 |
| EP | 2211506 A1 | 7/2010 |

*Primary Examiner* — Robert C Scheibel
(74) *Attorney, Agent, or Firm* — Harrington & Smith

(57) ABSTRACT

A method including defining at least one extended modification period; determining a system information change; generating at least one paging message indicator based on the paging message occurring within the at least one extended modification period.

21 Claims, 7 Drawing Sheets

(56) References Cited

U.S. PATENT DOCUMENTS

| | | | |
|---|---|---|---|
| 2015/0327155 A1* | 11/2015 | Lee | H04W 48/12 |
| | | | 370/329 |
| 2016/0112948 A1* | 4/2016 | Liang | H04W 24/02 |
| | | | 370/311 |
| 2016/0192292 A1* | 6/2016 | Hoglund | H04W 52/0216 |
| | | | 370/311 |
| 2016/0192323 A1* | 6/2016 | Kim | H04W 68/02 |
| | | | 455/458 |

* cited by examiner

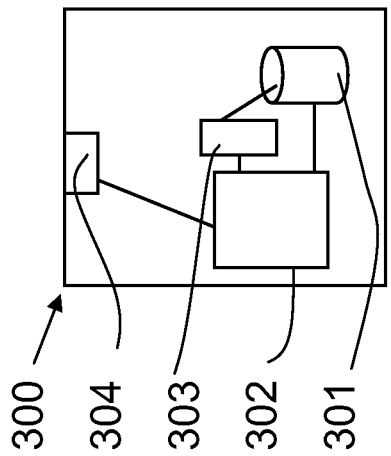
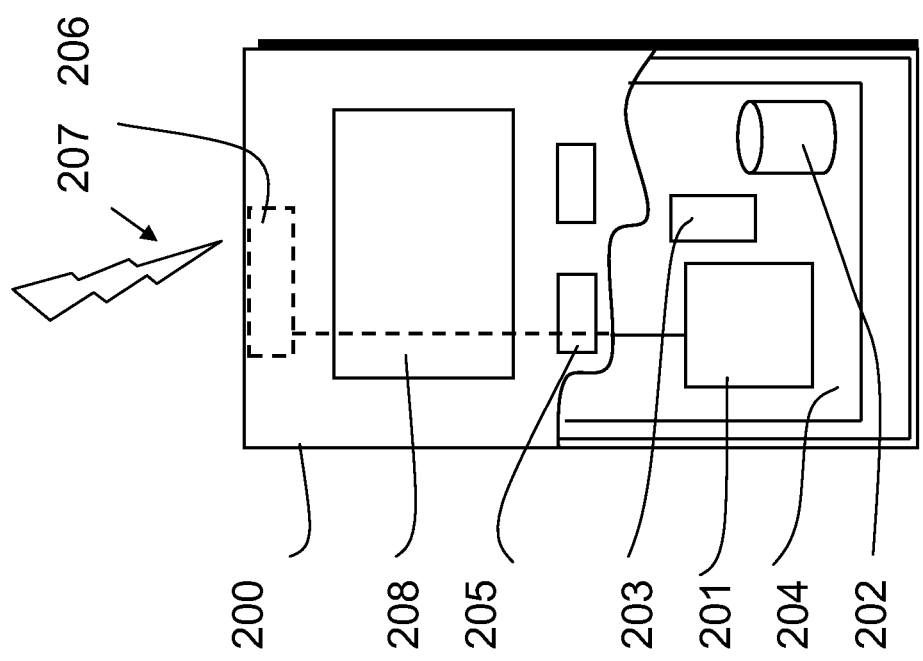
Figure 3
Figure 2

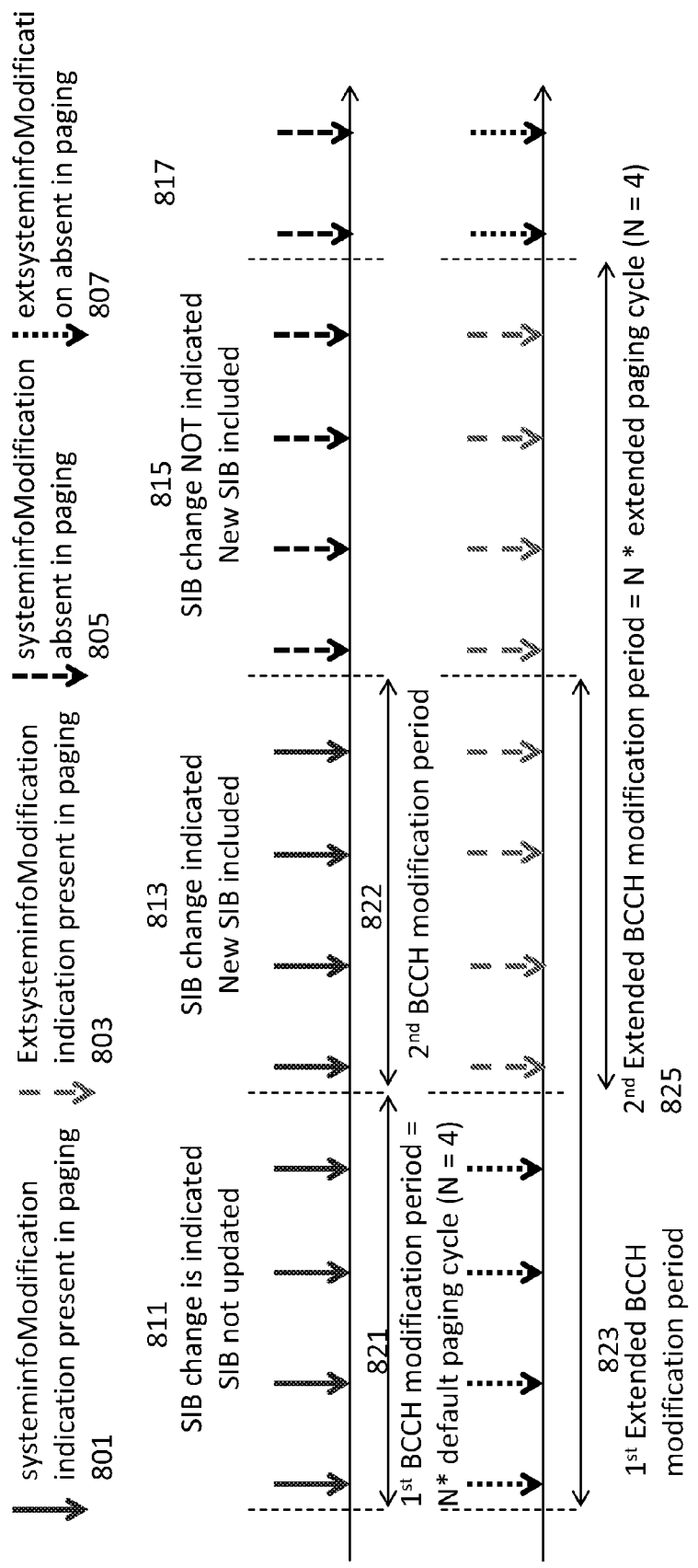

SYSTEM INFORMATION ACQUISITION BASED ON PAGING MESSAGE INDICATORS FOR NORMAL AND EXTENDED MODIFICATION PERIODS

FIELD

This disclosure relates to methods and apparatus implementing discontinuous reception modes and in particular but not exclusively to methods and apparatus for cellular systems implementing discontinuous reception modes of operation.

BACKGROUND

A communication system can be seen as a facility that enables communication sessions between two or more nodes such as fixed or mobile devices, machine-type terminals, access nodes such as base stations, servers and so on. A communication system and compatible communicating entities typically operate in accordance with a given standard or specification which sets out what the various entities associated with the system are permitted to do and how that should be achieved. For example, the standards, specifications and related protocols can define the manner how devices shall communicate, how various aspects of communications shall be implemented and how devices for use in the system shall be configured.

Signals can be carried on wired or wireless carriers. Examples of wireless systems include public land mobile networks (PLMN) such as cellular networks, satellite based communication systems and different wireless local networks, for example wireless local area networks (WLAN). Furthermore examples of wireless communication systems include architectures that are standardized by the 3rd Generation Partnership Project (3GPP). A recent development in this field is often referred to as the long-term evolution (LTE) of the Universal Mobile Telecommunications System (UMTS) radio-access technology.

A communication device can be provided with an appropriate signal receiving and transmitting arrangement for enabling communications with other devices. Typically a communication device is used for enabling receiving and transmission of communications such as speech and data. A user can access wirelessly a communication system by means of an appropriate wireless communication device or terminal, often referred to as user equipment (UE). Other types of wireless communication devices are also known, for example various access points, relays, and so on that are capable of communicating wirelessly with other devices.

A further type of communication network operation can be Machine Type Communication (MTC), a form of data communication which involves one or more entities that do not necessarily need human interaction. MTC is typically characterized by features such as a large number of devices, small data transmission, and low mobility. A network permitting MTC is expected to cater for the specific nature of such communication. The networks should for example be configured to enable efficient small data transmission and efficient UE power consumption optimization. Studies on the radio access network (RAN) aspects of Machine-Type and other mobile data applications Communications enhancements, have resulted in candidate solutions for UE power consumption optimization by configuring a much longer discontinuous reception (DRX) cycle in idle mode. In other words defining an extended paging cycle to the UE and therefore enabling the UE a longer "sleep" time period and lower power consumption.

Statement

According to a first aspect, there is provided a method comprising: defining at least one extended modification period; determining a system information change; generating at least one paging message indicator based on the paging message occurring within the at least one extended modification period.

The method may further comprise: defining at least one modification period; generating at least one further paging message indicator based on the paging message occurring within the at least one modification period.

The at least one further paging message indicator may be a sysinfoModification indicator.

The at least one paging message indicator may be an extsysinfoModification indicator.

Defining at least one extended modification period may comprise: aligning the start of the at least one extended modification period with a modification period;

generating the at least one extended modification period length as a modification period coefficient multiplied by an extended paging cycle.

The method may further comprise: determining a user equipment extended paging cycle is available; and defining the extended paging cycle length as the maximum supported extended paging cycle.

According to a second aspect there is provided a method comprising: receiving a paging message; determining within the paging message at least one of: a paging message indicator associated with a modification period and a paging message indicator associated with an extended modification period; controlling the acquisition of system information based on the paging message comprising at least one of: a paging message indicator associated with a modification period and a paging message indicator associated with an extended modification period.

Determining within the paging message at least one of: a paging message indicator associated with a modification period and a paging message indicator associated with an extended modification period may comprise determining only a paging message indicator associated with a modification period and wherein controlling the acquisition of system information based on the paging message may comprise initialising the system information acquisition from the start of the next modification period.

Determining within the paging message at least one of: a paging message indicator associated with a modification period and a paging message indicator associated with an extended modification period may comprise determining only a paging message indicator associated with an extended modification period, and wherein controlling the acquisition of system information based on the paging message may comprise initialising the system information acquisition immediately.

Determining within the paging message at least one of: a paging message indicator associated with a modification period and a paging message indicator associated with an extended modification period may comprise determining both a paging message indicator associated with a modification period and a paging message indicator associated with an extended modification period, and wherein controlling the acquisition of system information based on the paging message may comprise initialising the system information acquisition immediately and initialising the system information acquisition from the start of the next modification period.

According to a third aspect there is provided an apparatus comprising at least one processor and at least one memory including computer program code, the at least one memory and the computer program code configured to, with the at least one processor, cause the apparatus at least to: define at least one extended modification period; determine a system information change; generate at least one paging message indicator based on the paging message occurring within the at least one extended modification period.

The apparatus may be further caused to: define at least one modification period; generate at least one further paging message indicator based on the paging message occurring within the at least one modification period.

The at least one further paging message indicator may be a sysinfoModification indicator.

The at least one paging message indicator may be an extsysinfoModification indicator.

Defining at least one extended modification period may cause the apparatus to: align the start of the at least one extended modification period with a modification period; generate the at least one extended modification period length as a modification period coefficient multiplied by an extended paging cycle.

The apparatus may be further caused to: determine a user equipment extended paging cycle is available; and define the extended paging cycle length as the maximum supported extended paging cycle length.

According to a fourth aspect there is provided an apparatus comprising at least one processor and at least one memory including computer program code, the at least one memory and the computer program code configured to, with the at least one processor, cause the apparatus at least to: receive a paging message; determine within the paging message at least one of: a paging message indicator associated with a modification period and a paging message indicator associated with an extended modification period; control the acquisition of system information based on the paging message comprising at least one of: a paging message indicator associated with a modification period and a paging message indicator associated with an extended modification period.

Determining within the paging message at least one of: a paging message indicator associated with a modification period and a paging message indicator associated with an extended modification period may cause the apparatus to determine only a paging message indicator associated with a modification period and wherein controlling the acquisition of system information based on the paging message may cause the apparatus to initialise the system information acquisition from the start of the next modification period.

Determining within the paging message at least one of: a paging message indicator associated with a modification period and a paging message indicator associated with an extended modification period may cause the apparatus to determine only a paging message indicator associated with an extended modification period, and wherein controlling the acquisition of system information based on the paging message may cause the apparatus to initialise the system information acquisition immediately.

Determining within the paging message at least one of: a paging message indicator associated with a modification period and a paging message indicator associated with an extended modification period may cause the apparatus to determine both a paging message indicator associated with a modification period and a paging message indicator associated with an extended modification period, and wherein controlling the acquisition of system information based on the paging message may cause the apparatus to initialise the system information acquisition immediately and initialising the system information acquisition from the start of the next modification period.

According to a fifth aspect there is provided an apparatus comprising: means for defining at least one extended modification period; means for determining a system information change; means for generating at least one paging message indicator based on the paging message occurring within the at least one extended modification period.

The apparatus may further comprise: means for defining at least one modification period; means for generating at least one further paging message indicator based on the paging message occurring within the at least one modification period.

The at least one further paging message indicator may be a sysinfoModification indicator.

The at least one paging message indicator may be an extsysinfoModification indicator.

The means for defining at least one extended modification period may comprise: means for aligning the start of the at least one extended modification period with a modification period; means for generating the at least one extended modification period length as a modification period coefficient multiplied by an extended paging cycle.

The apparatus may further comprise: means for determining a user equipment extended paging cycle is available; means for defining the extended paging cycle length as the maximum supported extended paging cycle length as supported by the network comprising the user equipment.

According to a sixth aspect there is provided an apparatus comprising: means for receiving a paging message; means for determining within the paging message at least one of: a paging message indicator associated with a modification period and a paging message indicator associated with an extended modification period; means for controlling the acquisition of system information based on the paging message comprising at least one of: a paging message indicator associated with a modification period and a paging message indicator associated with an extended modification period.

The means for determining within the paging message at least one of: a paging message indicator associated with a modification period and a paging message indicator associated with an extended modification period may comprise means for determining only a paging message indicator associated with a modification period and wherein means for controlling the acquisition of system information based on the paging message may comprise means for initialising the system information acquisition from the start of the next modification period.

The means for determining within the paging message at least one of: a paging message indicator associated with a modification period and a paging message indicator associated with an extended modification period may comprise means for determining only a paging message indicator associated with an extended modification period, and wherein means for controlling the acquisition of system information based on the paging message may comprise means for initialising the system information acquisition immediately.

The means for determining within the paging message at least one of: a paging message indicator associated with a modification period and a paging message indicator associated with an extended modification period may comprise means for determining both a paging message indicator associated with a modification period and a paging message indicator associated with an extended modification period, and wherein means for controlling the acquisition of system information based on the paging message may comprise means for initialising the system information acquisition immediately and initialising the system information acquisition from the start of the next modification period.

According to a seventh aspect there is provided an apparatus comprising: an extended modification period definer configured to define at least one extended modification period; a system information change determiner configured to determine a system information change; a paging message generator configured to generate at least one paging message indicator based on the paging message occurring within the at least one extended modification period.

The apparatus may further comprise: a modification period definer configured to define at least one modification period; and the paging message generator is further configured to generate at least one further paging message indicator based on the paging message occurring within the at least one modification period.

The at least one further paging message indicator may be a sysinfoModification indicator.

The at least one paging message indicator may be an extsysinfoModification indicator.

The extended modification period definer may comprise: an aligner configured to align the start of the at least one extended modification period with a modification period; a period length generator configured to generate the at least one extended modification period length as a modification period coefficient multiplied by an extended paging cycle.

The apparatus may further comprise: a user equipment extended paging cycle determiner configured to determine a user equipment extended paging cycle is available; an extended paging cycle length definer configured to define the extended paging cycle length as the maximum supported extended paging cycle length as supported by the network comprising the user equipment.

According to an eighth aspect there is provided an apparatus comprising: a receiver configured to receive a paging message; a paging indicator determiner configured to determine within the paging message at least one of: a paging message indicator associated with a modification period and a paging message indicator associated with an extended modification period; a controller configured to control the acquisition of system information based on the paging message comprising at least one of: a paging message indicator associated with a modification period and a paging message indicator associated with an extended modification period.

The paging indicator determiner may be configured to determine only a paging message indicator associated with a modification period and wherein the controller may be configured to initialise the system information acquisition from the start of the next modification period.

The paging indicator determiner may be configured to determine only a paging message indicator associated with an extended modification period, and wherein the controller may be configured to initialise the system information acquisition immediately.

The paging indicator determiner may be configured to determine both a paging message indicator associated with a modification period and a paging message indicator associated with an extended modification period, and wherein the controller may be configure to initialise the system information acquisition immediately and initialising the system information acquisition from the start of the next modification period.

SUMMARY OF FIGURES

Some embodiments will now be described with reference to the accompanying figures in which:

FIG. 2 shows a schematic diagram of a mobile communication device according to some embodiments;

FIG. 3 shows a schematic diagram of a control apparatus according to some embodiments;

FIG. 8 shows a timing diagram showing the further application of an extended system information modification indicator according to some embodiments.

DESCRIPTION OF EXAMPLE EMBODIMENTS

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 1 to 3 to assist in understanding the technology underlying the described examples.

In a wireless communication system mobile communication devices or user equipment (UE) 102, 103, 105 are provided wireless access via at least one base station or similar wireless transmitting and/or receiving node or point. In the FIG. 1 an example of two overlapping access systems or radio service areas of a cellular system 100 and 110 provided by base stations 106 and 107 and three smaller radio service areas 115, 117 and 119 provided by remote radio heads (RRH) 116, 118 and 120 are shown. Each mobile communication device and base station/RRH may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell may be served by the same base station.

Figure 1:
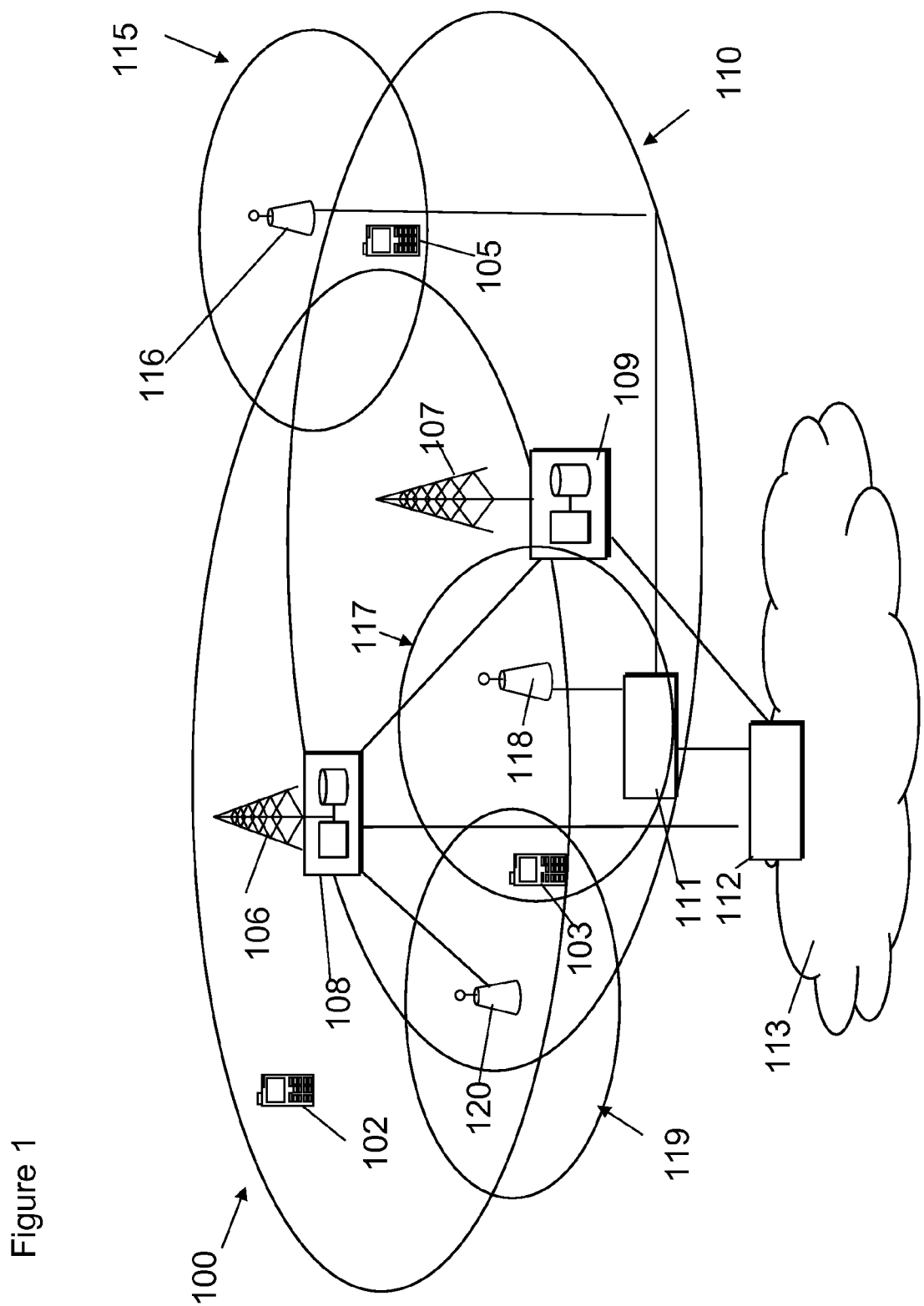
FIG. 1 shows a schematic diagram of a communication system comprising a base station and a plurality of communication devices.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The remote radio heads 116, 118 and 120 are connected to a respective macro cell. Thus RRH 120 is connected to macro cell base station 106 and RRHs 118 and 116 are connected to macro cell base station 109. The RRHs are located in the respective macro cell provided by the macro cell base station to which they are connected.

A possible mobile communication device will now be described in more detail with reference to FIG. 2 showing a schematic, partially sectioned view of a communication device 102. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 102 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A wireless communication device can be provided with a Multiple Input/Multiple Output (MIMO) antenna system. MIMO arrangements as such are known. MIMO systems use multiple antennas at the transmitter and receiver along with advanced digital signal processing to improve link quality and capacity. Although not shown in FIGS. 1 and 2, multiple antennas can be provided, for example at base stations and mobile stations, and the transceiver apparatus 206 of FIG. 2 can provide a plurality of antenna ports. More data can be received and/or sent where there are more antenna elements. A station may comprise an array of multiple antennas. Signalling and muting patterns can be associated with TX antenna numbers or port numbers of MIMO arrangements.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

FIG. 3 shows an example of a control apparatus for a communication system, for example to be coupled to and/or for controlling a station of an access system, such as a base station. In some embodiments, base stations comprise a separate control apparatus. In other embodiments, the control apparatus can be another network element such as a radio network controller. In some embodiments, each base station may have such a control apparatus as well as a control apparatus being provided in a radio network controller. The control apparatus 109 can be arranged to provide control on communications in the service area of the system. The control apparatus 109 comprises at least one memory 301, at least one data processing unit 302, 303 and an input/output interface 304. Via the interface the control apparatus can be coupled to a receiver and a transmitter of the base station. For example the control apparatus 109 can be configured to execute an appropriate software code to provide the control functions.

The communication devices 102, 103, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology. The various development stages of the 3GPP LTE specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Some embodiments may be used with LTE (or LTE-Advanced) co-channel deployment of macro eNBs and low power eNBs in the form of RRHs. Alternatively or additionally embodiments may be used with smaller cells such as pico or femto cells and/or other relay stations. The smaller cells and/or relay stations may be in communication with a macro eNB. One example of is a co-channel LTE HetNet scenario. This may arise where more than one transmitter is using the same channel or frequency. Some embodiments may address the problem of joint multi-cell packet scheduling for the downlink of such a system, while still maintaining fairness among all users.

As discussed herein studies on the radio access network (RAN) aspects of Machine-Type and other mobile data applications communications enhancements, have resulted in candidate solutions for UE power consumption optimization by configuring a much longer discontinuous reception (DRX) cycle in idle mode. In other words defining an extended paging cycle to the UE and therefore enabling the UE a longer "sleep" time period and lower power consumption.

In such situations a user equipment (UE) or suitable mobile communications device could apply discontinuous reception (DRX) in idle mode to receive paging periodically for power saving. The subframes where the UE listens to the paging channel are calculated based on the UE identity and paging related parameters advertised in system information.

While the paging message is used to deliver the paging record for respective UEs, the change of system information is also indicated by the paging message. If the UE receives a Paging message including a system information modification indicator, for example a 'systemInfoModification' indicator then the UE determines that the system information will change at the next modification period boundary and can be configured to acquire the new system information immediately from the start of the next modification period.

Figure 6:
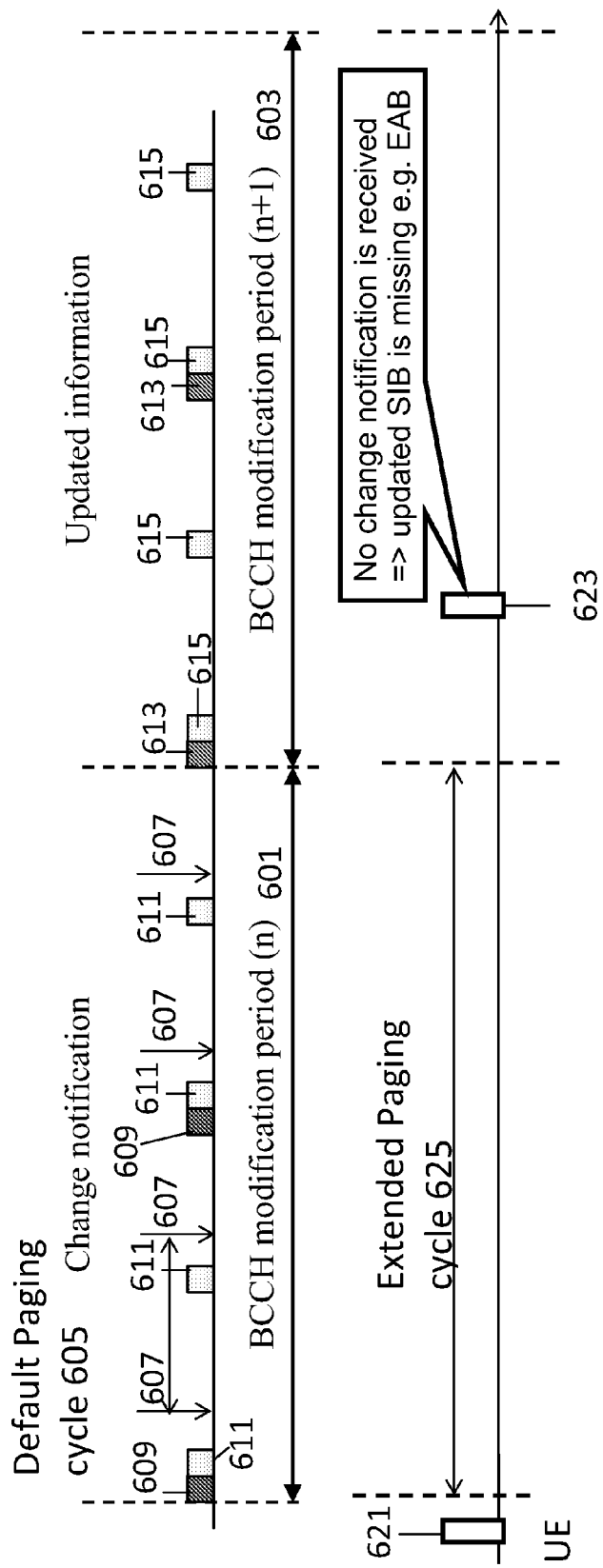
FIG. 6 shows a timing diagram showing an example operation of current method of BCCH paging the mobile communication device apparatus.

For example in FIG. 6 an example broadcast control channel (BCCH) timeline is shown with two modification periods, a (n) modification period 601 and a succeeding (n+1) modification period 603. Within the (n) modification period 601 the control apparatus broadcasts system information to the UEs operating within the current cell or network access point, this system information is shown by blocks 609 and 611. Similarly within the (n+1) modification period 603 the control apparatus broadcasts system information to the UEs operating within the current cell or network access point, this system information is shown by blocks 613 and 615. From this figure, block 613 is different from block 609 which means the system information has been changed.

When the network or control apparatus decides to change the system information, an system information modification indicator, for example a 'systemInfoModification' indicator is configured to be added to all paging messages during BCCH modification period (n). The network or control apparatus can then be configured to send the updated information in the succeeding modification period, which in FIG. 6 is the BCCH modification period (n+1) 603. The paging information respective to certain UE is shown in FIG. 6 by the paging arrows 607. The paging information is typically sent several times in one modification period which is defined by a repetition or paging cycle or period 605. In FIG. 6 the paging cycle is such that there are 4 pages within the modification period. This is the result of a relationship of modification period=N*paging cycle where in the example shown in FIG. 6 N=4.

There is a possible problem or issue with the current proposed extended DRX cycle when applied to idle mode in that it is likely that the UE would miss the system information change indication during the whole BCCH modification period (n) because of the very long sleep time. In such situations the UE does not keep the latest system information which may impact the UE from being able to access the network and therefore degrade the system performance. This for example is shown in FIG. 6 by the second, lower, timing line which shows the distance between UE consecutive active periods 621 and 623 being greater than the extended paging cycle 625.

It has been proposed to overcome the problem with by extending the BCCH modification period by replacing the default paging cycle with an extended paging cycle.

In other words

BCCH modification period(#radio frames)
=modificationPeriodCoeff*extendedPagingCycle.

However as the updated system information would not be sent until the next system information block (SIB) modification period, the extension of the modification period would increase the time period to update the system information and which would impact the performance of UEs not applying extended paging cycle.

A further proposal has been to always acquire system information before paging occasions. This ensures that the UE could acquire the latest system information, however this option is at the cost of more power consumption. For example especially when the system information does not change frequently, it is not necessary to read system information before every paging occasion. Considering the initial intention of an extended DRX cycle is to save power, it would be inefficient to mandate system information block (SIB) reading in this way.

The concept as applied in embodiments described herein is to define a solution where:
1) The UE acquires the system information block (SIB) only when it does change.
2) The solution shall not impact the system information change of normal UEs.

The concept as applied in embodiments described herein is therefore to configure the network, such as controlled by the control apparatus to indicate the change of system information block (SIB) for the user equipment configured with extended paging cycle using a dedicated indicator or indication within the paging message. Based on the combination of current system information modification indicators and the proposed indicator the user equipment can be configured to determine whether to acquire the system information at the next modification period boundary and/or immediately.

Figure 4:
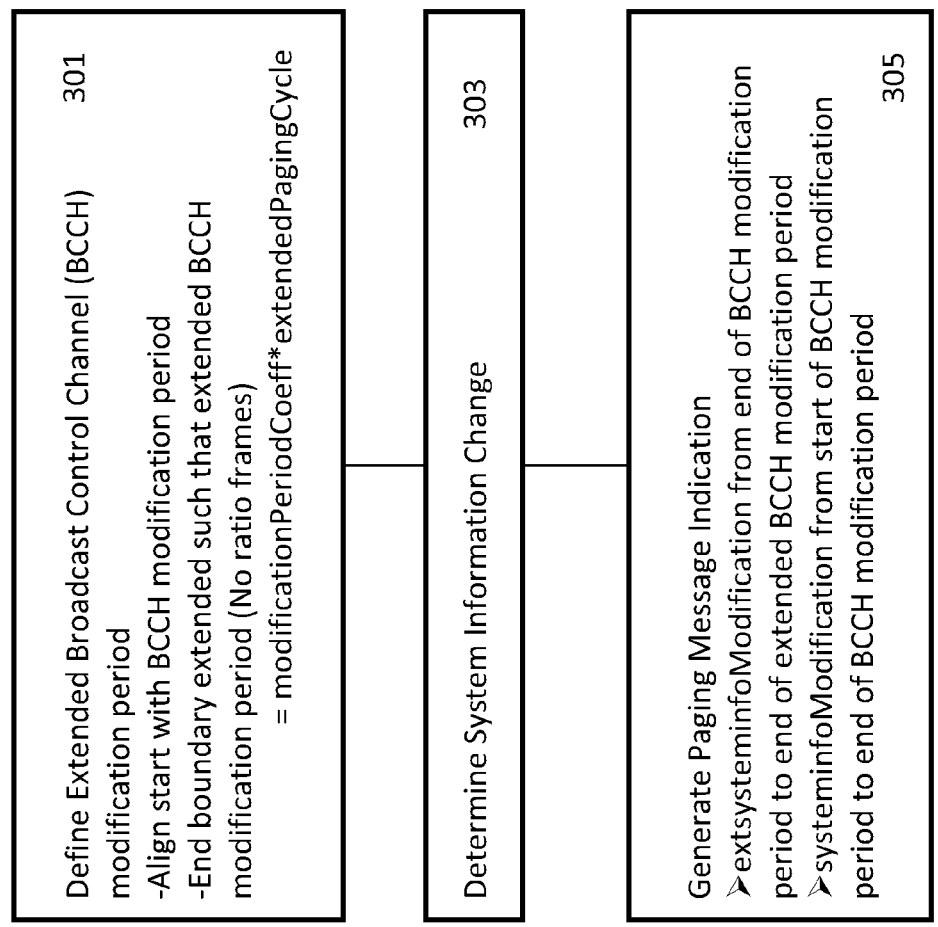
FIG. 4 shows a flow diagram showing an operation of the control apparatus as shown in FIG. 3 according to some embodiments.

With respect to FIG. 4 a flow diagram shows the operation of the control apparatus according to a first set of embodiments. Furthermore with respect to FIG. 7 a timing diagram shows the application of an extended system information modification indicator according to some embodiments as generated by the control apparatus operating according to the method shown in FIG. 4.

In some embodiments the control apparatus can be configured to control the network such that the control apparatus defines an extended broadcast control channel (BCCH) modification period. The control apparatus can for example align the start of the extended broadcast control channel modification period with the start of the BCCH modification period. Furthermore the control apparatus can define the end boundary of the extended broadcast control channel modification period such that the length of the extended broadcast control channel modification period is defined (in terms of the number of radio frames) as the extended paging cycle multiplied by a modification period coefficient. In other words two periods are defined.

These two periods can in some embodiments be expressed as:

(normal)BCCH modification period(#radio frames)
 =modificationPeriodCoeff*defaultPagingCycle.

and extended BCCH modification period(#radio frames)
 =modificationPeriodCoeff*extendedPagingCycle.

Wherein defaultPagingCycle is the paging cycle advertised by the network in the system information. The operation of defining an extended broadcast control channel modification period is shown in FIG. 4 by step 301.

Figure 7:
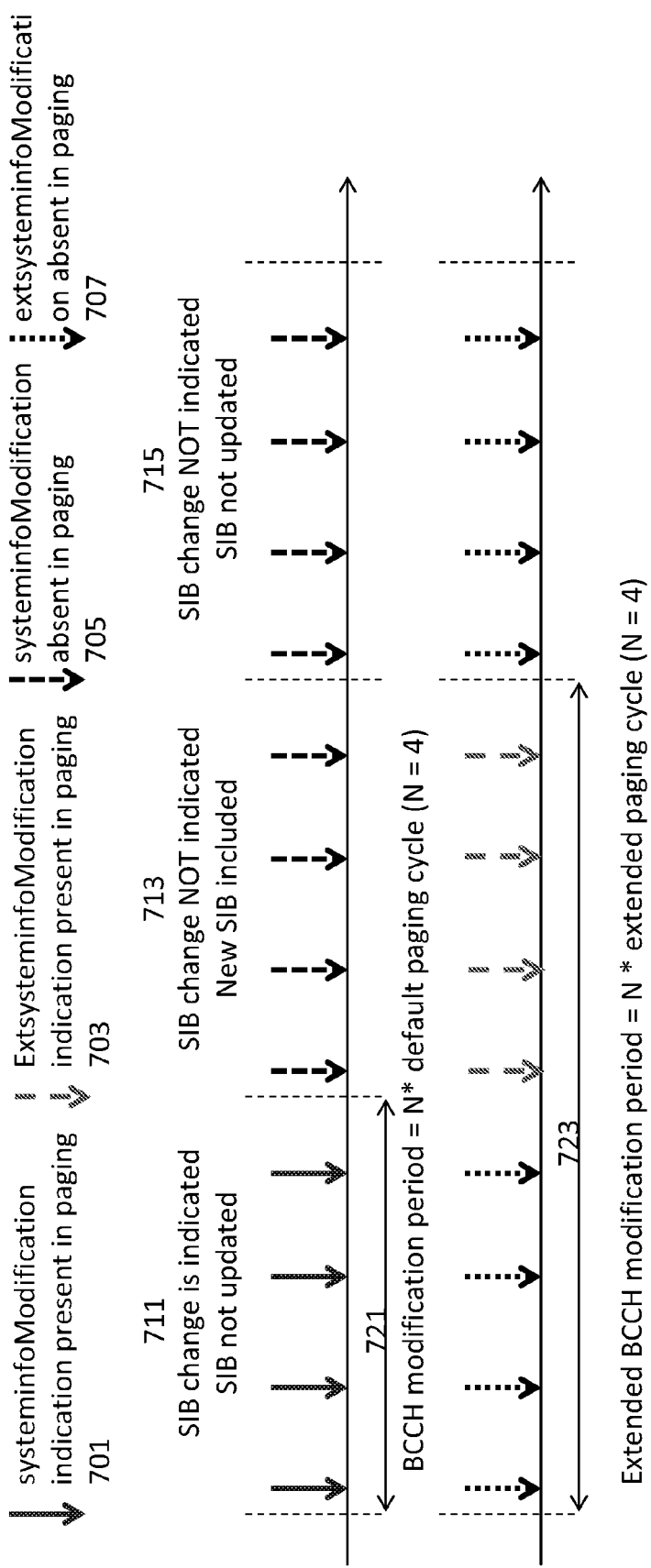
FIG. 7 shows a timing diagram showing the application of an extended system information modification indicator according to some embodiments.

FIG. 7 shows the BCCH modification period 721 on the upper timing line and the extended BCCH modification period 723 on the lower timing line. In the example shown in FIG. 7 the modificationPeriodCoeff N=4.

In some embodiments where the user equipment has a defined specific extended paging cycle then the supported maximum extended paging cycle is used to determine the extended BCCH modification period.

Where the network decides to change system information then the control apparatus can be configured to determine a system information change operation is to be applied.

The determination of system information change is shown in FIG. 4 by step 303.

In such embodiments the control apparatus can be configured to generate paging messages comprising indicators or indications based on whether the paging message is within the BCCH modification period or extended BCCH modification period.

For example in some embodiments the control apparatus is configured to generate a (normal) system information modification indicator to be inserted into a paging message when the paging message occurs within the BCCH modification period. In some embodiments the system information modification indicator is a 'systeminfoModification' flag or indication bit which is active when the paging message is within the BCCH modification period.

FIG. 7 shows as described herein the BCCH modification period 721 on the upper timing line. Within the BCCH modification period 721 are shown the paging messages 701 comprising the systeminfoModification indicators. In this period 711 the SIB change is indicated but the SIB is not updated.

Furthermore FIG. 7 shows on the upper timing line where paging messages 705 do not comprise a systeminfoModification indicator or where systeminfoModification indicator are absent from the paging messages. This occurs after the end of the BCCH modification period 721.

Furthermore in some embodiments the control apparatus is configured to generate an extended system information modification indicator to be inserted into a paging message when the paging message occurs within the extended BCCH modification period but after the end of the BCCH modification period. In some embodiments the extended system information modification indicator is an 'extsysteminfoModification' flag or indication bit which is active when the paging message is within the extended BCCH modification period but after the end of the BCCH modification period.

FIG. 7 shows as described herein the extended BCCH modification period 723 on the lower timing line. Within the extended BCCH modification period 723 but after the end of the BCCH modification period are shown the paging messages 703 comprising the extsysteminfoModification indicators. In this period 713 the SIB change is not indicated but the new SIB is included.

Furthermore FIG. 7 shows on the lower timing line where paging messages 707 do not comprise the extsysteminfoModification indicator or where extsysteminfoModification indicators are absent from the paging messages, which for the lower timing line is before the end of the BCCH modification period 721 (during which period the paging message comprises a systeminfoModification indicator as shown in the upper timeline) and after the extended BCCH modification period 723. The period after the extended BCCH modification period 723 in particular is where the SIB change is not indicated and the SIB is not updated.

The operation of generating the paging message indicators is shown in FIG. 4 by step 305.

These indicators, within the paging messages, are transmitted to the user equipment over the BCCH.

In some embodiments the control apparatus can be configured to control the network such that the control apparatus defines extended broadcast control channel (BCCH) modification periods. The control apparatus can for example align the start of a first extended broadcast control channel modification period with the start of the first BCCH modification period and align the start of the second extended broadcast control channel modification period with the start of the second BCCH modification period. Furthermore the control apparatus can define the end boundary of the extended broadcast control channel modification period such that the length of the extended broadcast control channel modification periods are defined (in terms of the number of radio frames) as the extended paging cycle multiplied by a modification period coefficient.

FIG. 8 shows a first BCCH modification period 821 and a second BCCH modification period 822 on the upper timing line. Furthermore FIG. 8 shows a first extended BCCH modification period 823 starting at or aligned with the start of the first BCCH modification period and a second extended BCCH modification period 825 starting at or aligned with the start of the second BCCH modification period 822 on the lower timing line. In the example shown in FIG. 8 the modificationPeriodCoeff N=4.

In such embodiments the control apparatus can be configured to generate paging messages comprising indicators or indications based on whether the paging message is within the BCCH modification period or extended BCCH modification periods.

For example in some embodiments the control apparatus is configured to generate a (normal) system information modification indicator to be inserted into a paging message when the paging message occurs within the first or second BCCH modification period. In some embodiments the system information modification indicator is a 'systeminfoModification' flag or indication bit which is active when the paging message is within the first or second BCCH modification period.

FIG. 8 shows as described herein the BCCH modification period 821 and a second BCCH modification period 822 on the upper timing line. Within the first BCCH modification period 821 and the second BCCH modification period 822 shown on the upper timing line are shown the paging messages 801 comprising the systeminfoModification indicators. In the first BCCH modification period 811 the SIB change is indicated but the SIB is not updated and in the second BCCH modification period 813 the SIB change is indicated and the new SIB is included as the result of the modification indicator or indications during the first BCCH modification.

Furthermore FIG. 8 shows on the upper timing line where paging messages 805 do not comprise a systeminfoModification indicator or where systeminfoModification indicator are absent from the paging messages. This occurs after the end of the second BCCH modification period 813.

Furthermore in some embodiments the control apparatus is configured to generate an extended system information modification indicator to be inserted into a paging message when the paging message occurs within the extended BCCH modification period but after the end of the (associated) BCCH modification period In some embodiments the extended system information modification indicator is an 'extsysteminfoModification' flag or indication bit which is active when the paging message is within the extended BCCH modification period but after the end of the BCCH modification period.

FIG. 8 shows as described herein the first extended BCCH modification period 823 aligned with the start of the first BCCH modification period 821 and the second extended BCCH modification period 825 aligned with the start of the second BCCH modification period 822 on the lower timing line. Within the first extended BCCH modification period 823 but after the end of the first BCCH modification period 821, and within the second extended BCCH modification period 825 but after the end of the second BCCH modification period 822, are shown the paging messages 803 comprising the extsysteminfoModification indicators. In these periods, the first period 813 is where the SIB change is indicated and the new SIB as the result of the modification indicator or indications during the first BCCH modification is included and the second period 815 is where the SIB change is not indicated but the new SIB as the result of the modification indicator or indications during the second BCCH modification is included.

Furthermore FIG. 8 shows on the lower timing line where paging messages 807 do not comprise the extsysteminfoModification indicator or in other words where extsysteminfoModification indicators are absent from the paging messages, which for the lower timing line is before the end of the first BCCH modification period 821 (during which period the paging message comprises a systeminfoModification indicator as shown in the upper timeline) and after the second extended BCCH modification period 825. The period after the second extended BCCH modification period 825 in particular is where the SIB change is not indicated and the SIB is not updated.

Figure 5:
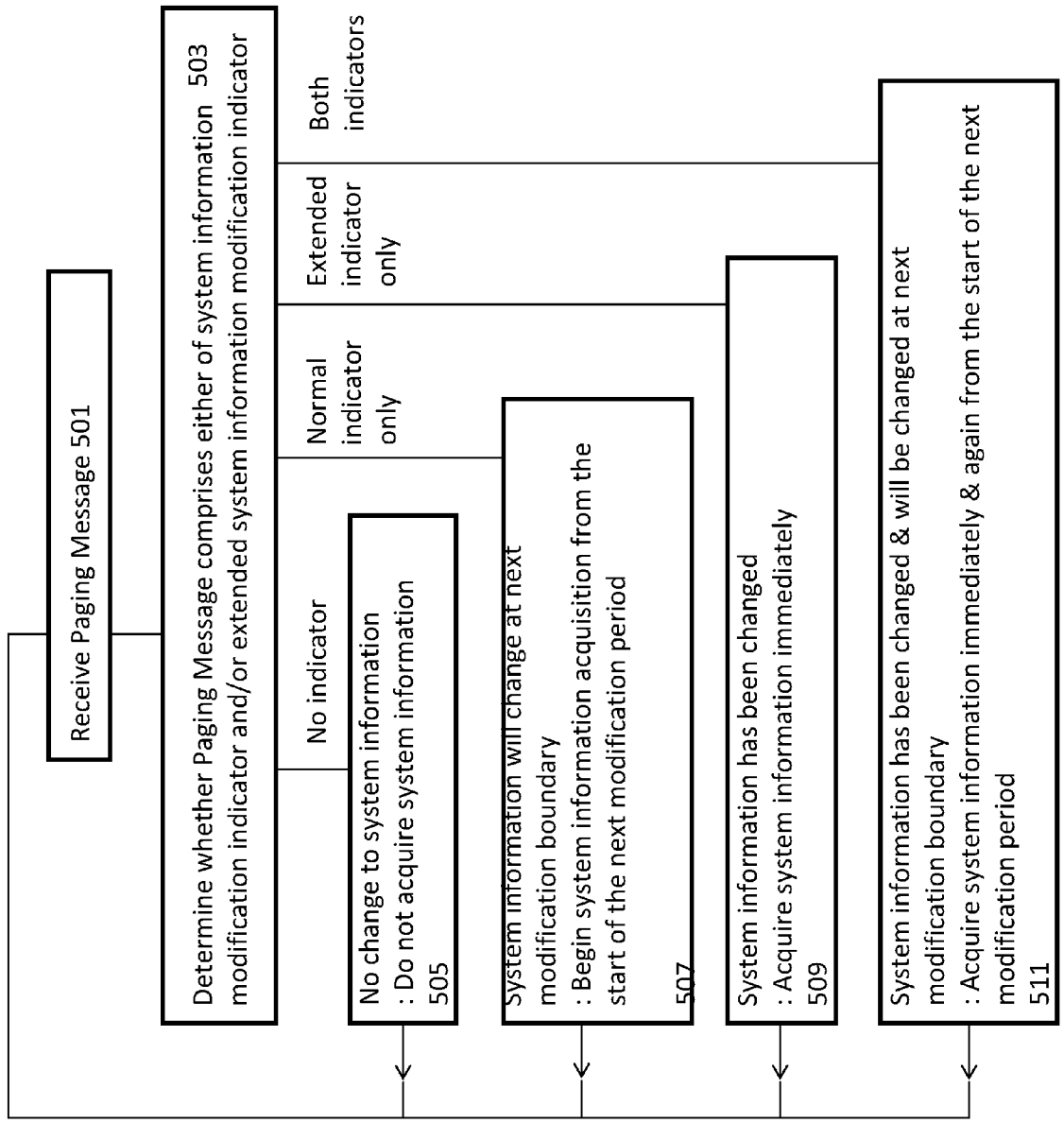
FIG. 5 shows a flow diagram showing an operation of the mobile communication device apparatus as shown in FIG. 2 according to some embodiments.

With respect to FIG. 5 a flow diagram shows the operation of the mobile communication device or user equipment operating according to some embodiments as described herein.

In some embodiments the mobile communications device apparatus is configured to receive the paging message.

The operation of receiving the paging message is shown in FIG. 5 by step 501.

In some embodiments the mobile communication device comprises a paging message decoder or determiner configured to determine whether the paging message received comprises either of the system information modification indicator and/or the extended system information modification indicator.

The operation of determining whether the paging message comprises either of the system information modification indicator and/or the extended system information modification indicator is shown in FIG. 5 by step 503.

In some embodiments the paging message determiner or decoder can be configured to determine that there was no indicator in the paging message, in other words neither the system information modification indicator nor the extended system information modification indicator was within the received paging message. In such a situation the paging message determiner can be configured to determine that there is no change to the system information and therefore no need to acquire any system information or start any acquisition operations.

The operation of determining that there is no indicator and therefore no change to the system information is shown in FIG. 5 by step 505.

Furthermore in some embodiments the operation can then loop back to receiving further paging messages or listening for further paging messages, in other words passing back to step 501.

In some embodiments the paging message determiner or decoder can be configured to determine that the received paging message comprises only a (normal) indicator (the system information modification indicator). In such embodiments the paging message determiner can be configured to begin system information acquisition from the start of the next modification period. This is because the system information will change at the next modification period boundary.

The operation of determining that system information will change at the next modification period boundary and to begin system information acquisition from the start of the next modification period is shown in FIG. 5 by step 507.

In some embodiments the operation can then loopback to receiving further paging messages, in other words pass back to step 501.

In some embodiments the paging message determiner can be configured to determine that the received paging message comprises only the extended system information modification indicator. In such embodiments the paging message determiner can be configured to acquire system information immediately or for the current modification period to be applied as the system information has already been changed, in other words the boundary defining when the system information has changed has passed.

The operation of acquiring the system information immediately because the system information has been changed is shown in FIG. 5 by step 509.

In some embodiments the operation can then looped back to receiving further paging messages, in other words passing back to step 501.

In some embodiments the paging message determiner can be configured to determine that the received paging message comprises both indicators. In such embodiments the paging message determiner can be configured to determine that system information has been changed and will be changed at the next modification period boundary. Furthermore in some embodiments the paging message determiner can be configured to acquire system information immediately or for the current modification period and furthermore again from the start of the next modification period.

The operation of acquiring system information immediately and again from the start of the next modification period can be found in FIG. 5 by step 511.

Furthermore in some embodiments the operation can loop back to receive a further paging message, in other words passing back to step 501.

It is noted that whilst embodiments have been described in relation to LTE, similar principles may be applied to any other communication system or to further developments with LTE. Therefore, although certain embodiments are described above by way of example with reference to certain exemplifying architectures for wireless networks, technologies and standards, embodiments may be applied to any other suitable forms of communication systems than those illustrated and described herein.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

What is claimed is:

1. A method comprising:
defining at least one modification period and at least one extended modification period for a paging message;
determining a system information change;
in response to determining the system information change, generating at least one paging message indicator based on the paging message, comprising an indicator for the at least one extended modification period, wherein the indicator for the at least one extended modification period is only active when the paging message is occurring within the at least one extended modification period and after an end of the at least one modification period;
transmitting the paging message occurring within the at least one extended modification period and after an end of the at least one modification period to a user equipment, the paging message comprising the generated at least one paging message indicator indicating to the user equipment that the user equipment is to acquire the changed system information in a same extended modification period as the paging message is transmitted; and
transmitting the system information in the same extended modification period as the paging message is transmitted.

2. The method as claimed in claim 1, further comprising:
generating at least one further paging message indicator based on the paging message occurring within the at least one modification period.

3. The method as claimed in claim 2, wherein the at least one further paging message indicator comprises a sysinfo-Modification indicator.

4. The method as claimed in claim 1, wherein the at least one paging message indicator comprises an extsysinfoModification indicator.

5. The method as claimed in claim 1, wherein defining the at least one extended modification period comprises:
aligning a start of the at least one extended modification period with a next modification period;
generating the at least one extended modification period length in terms of a number of radio frames as a modification period coefficient multiplied by an extended paging cycle.

6. The method as claimed in claim 5, further comprising:
determining a user equipment extended paging cycle is available; and
defining the extended paging cycle length as a maximum supported extended paging cycle length as supported by a network comprising the user equipment.

7. The method of claim 1, wherein the extended modification period is extended relative to a modification period, the modification period corresponds to a first paging cycle, the extended modification period corresponds to a second paging cycle, and the second paging cycle is extended relative to the first paging cycle.

8. The method of claim 7, wherein a discontinuous reception cycle is longer than the modification period.

9. A computer program product comprising a non-transitory computer-readable medium having computer program code thereon, the computer program code configured to cause an apparatus, in response to execution of the computer program code, to perform a method as in claim 1.

10. A method comprising:
receiving a paging message;
determining the paging message comprises at least one of: a paging message indicator associated with a modification period and a paging message indicator associated with an extended modification period; and
acquiring system information based on the paging message, comprising monitoring either the paging message indicator associated with the extended modification period or both the paging message indicator associated with the modification period and the paging message indicator associated with the extended modification period, wherein determining whether the paging message comprises at least one of: a paging message indicator associated with a modification period and a paging message indicator associated with an extended modification period comprises determining the paging message comprises both a paging message indicator associated with a modification period and a paging message indicator associated with an extended modification period, and wherein acquiring system information based on the paging message comprises, in response to the paging message comprising the paging message indicator associated with the modification period and the paging message comprising the paging message indicator associated with the extended modification period, acquiring the system information comprising initializing the system information from a start of a next modification period.

11. The method as claimed in claim 10, wherein determining the paging message comprises at least one of: a paging message indicator associated with a modification period and a paging message indicator associated with an extended modification period comprises determining the paging message comprises only a paging message indicator associated with the extended modification period, and wherein acquiring the system information based on the paging message comprises acquiring the system information in the same modification period as the paging message is received.

12. The method of claim 10, wherein the extended modification period is extended relative to the modification period, the modification period corresponds to a first paging cycle, the extended modification period corresponds to a second paging cycle, and the second paging cycle is extended relative to the first paging cycle.

13. The method of claim 12, wherein a discontinuous reception cycle is longer than the modification period.

14. The method of claim 13, wherein determining the paging message comprises at least one of: a paging message indicator associated with a modification period and a paging message indicator associated with an extended modification period further comprises determining the paging message comprises the paging message indicator associated with the extended modification period and acquiring further comprises acquiring system information at a next modification period boundary.

15. A computer program product comprising a non-transitory computer-readable medium having computer program code thereon, the computer program code configured to cause an apparatus, in response to execution of the computer program code, to perform a method as in claim 10.

16. A method comprising:
receiving a paging message;
determining within the paging message at least one of: a paging message indicator associated with a modification period and a paging message indicator associated with an extended modification period; and
controlling acquisition of system information based on the paging message comprising monitoring either the paging message indicator associated with the extended modification period or both the paging message indicator associated with the modification period and the paging message indicator associated with the extended modification period,
wherein determining within the paging message at least one of: a paging message indicator associated with a modification period and a paging message indicator associated with an extended modification period comprises determining both a paging message indicator associated with a modification period and a paging message indicator associated with an extended modification period, and wherein controlling the acquisition of system information based on the paging message comprises initializing the system information acquisition immediately and initializing the system information acquisition from a start of a next modification period.

17. An apparatus comprising at least one processor and at least one memory including computer program code, the at least one memory and the computer program code configured to, with the at least one processor, cause the apparatus at least to:
define at least one modification period and at least one extended modification period for a paging message;
determine a system information change;
in response to determining the system information change, generate at least one paging message indicator based on the paging message, comprising an indicator for the at least one extended modification period, wherein the indicator for the at least one extended modification period is only active when the paging message is occurring within the at least one extended modification period;
transmitting the paging message occurring within the at least one extended modification period and after an end of the at least one modification period to a user equipment, the paging message comprising the generated at least one paging message indicator indicating to the user equipment that the user equipment is to acquire the changed system information in a same extended modification period as the paging message is transmitted; and
transmitting the system information in the same extended modification period as the paging message is transmitted.

18. The apparatus as claimed in claim 17, further caused to:
generate at least one further paging message indicator based on the paging message occurring within the at least one modification period.

19. An apparatus comprising at least one processor and at least one memory including computer program code, the at least one memory and the computer program code configured to, with the at least one processor, cause the apparatus at least to:
receive a paging message;
determine the paging message comprises at least one of: a paging message indicator associated with a modification period and a paging message indicator associated with an extended modification period; and
acquiring system information based on the paging message, comprising monitoring either the paging message indicator associated with the extended modification period or both the paging message indicator associated with the modification period and the paging message indicator associated with the extended modification period, wherein determining whether the paging message comprises at least one of: a paging message indicator associated with a modification period and a paging message indicator associated with an extended modification period comprises determining the paging message comprises both a paging message indicator associated with a modification period and a paging message indicator associated with an extended modification period, and wherein acquiring system information based on the paging message comprises, in response to the paging message comprising the paging message indicator associated with the modification period and the paging message comprising the paging message indicator associated with the extended modification period, acquiring the system information comprising initializing the system information from a start of a next modification period.

20. The apparatus as claimed in claim 19, wherein determining the paging message comprises at least one of: a paging message indicator associated with a modification period and a paging message indicator associated with an extended modification period comprises determining the paging message comprises only a paging message indicator associated with the extended modification period, and wherein acquiring the system information comprises acquiring the system information acquisition in a same modification period as the paging message is received.

21. An apparatus comprising:
An apparatus comprising at least one processor and at least one memory including computer program code, the at least one memory and the computer program code configured to, with the at least one processor, cause the apparatus at least to:
receive a paging message;
determine within the paging message at least one of: a paging message indicator associated with a modification period and a paging message indicator associated with an extended modification period; and
control acquisition of system information based on the paging message comprising monitoring either the paging message indicator associated with the extended modification period or both the paging message indicator associated with the modification period and the paging message indicator associated with the extended modification period, wherein determining whether the paging message comprises at least one of: a paging message indicator associated with a modification period and a paging message indicator associated with an extended modification period comprises determining the paging message comprises both a paging message indicator associated with a modification period and a paging message indicator associated with an extended modification period, and wherein acquiring system information based on the paging message comprises acquiring the system information acquisition in a same modification period as the paging message is received and acquiring the system information in a next modification period.

\* \* \* \* \*